US012565224B2

(12) United States Patent
Huang et al.

(10) Patent No.: US 12,565,224 B2
(45) Date of Patent: Mar. 3, 2026

(54) VEHICULAR CONTROL SYSTEM HAVING A PLURALITY OF ELECTRONIC CONTROL UNITS

(71) Applicant: Magna Electronics Inc., Auburn Hills, MI (US)

(72) Inventors: Albert Huang, Sunnyvale, CA (US); Sertac Karaman, Cambridge, MA (US); Ryan C.C. Chin, Boston, MA (US); Jenny Larios Berlin, Chestnut Hill, MA (US); Ramiro Almeida, Key Biscayne, FL (US)

(73) Assignee: Magna Electronics Inc., Auburn Hills, MI (US)

( * ) Notice: Subject to any disclaimer, the term of this patent is extended or adjusted under 35 U.S.C. 154(b) by 279 days.

(21) Appl. No.: 18/058,286

(22) Filed: Nov. 23, 2022

(65) Prior Publication Data
US 2023/0110082 A1 Apr. 13, 2023

Related U.S. Application Data

(63) Continuation of application No. 16/682,644, filed on Nov. 13, 2019, now Pat. No. 11,511,762.
(Continued)

(51) Int. Cl.
*B60W 50/029* (2012.01)
*B60W 30/18* (2012.01)
*G05D 1/00* (2006.01)

(52) U.S. Cl.
CPC .......... *B60W 50/029* (2013.01); *B60W 30/18* (2013.01); *G05D 1/0055* (2013.01); *G05D 1/0088* (2013.01); *B60W 2556/00* (2020.02)

(58) Field of Classification Search
CPC .......................... B60W 30/018; B60W 50/029
See application file for complete search history.

(56) References Cited

U.S. PATENT DOCUMENTS

| 7,103,460 | B1 | 9/2006 | Breed |
| 11,299,049 | B2 | 4/2022 | Linehan et al. |

(Continued)

FOREIGN PATENT DOCUMENTS

| DE | 102015003124 A1 | 9/2016 |
| EP | 3323687 A1 | 5/2018 |
| EP | 3363698 A1 | 8/2018 |

OTHER PUBLICATIONS

International Seach Report and Written Opinion of the International Searching Authority for International PCT Application No. PCT/US2019/061240 mailed Jan. 27, 2020.
(Continued)

*Primary Examiner* — Jess Whittington
(74) *Attorney, Agent, or Firm* — HONIGMAN LLP

(57) ABSTRACT

A vehicular control system includes a plurality of electronic control units (ECUs), each providing a respective quantity of computational units representative of an amount of processing power of the respective ECU. The ECUs operate a vehicle in a nominal autonomous operational mode when a sum of the quantity of computational units exceeds a threshold. The system, while the ECUs operate the vehicle in the nominal autonomous operational mode, and responsive to detecting a failure of one of the ECUs, determines whether a sum of the quantity of computational units of the remaining ECUs that do not have a failure exceeds the threshold. The ECUs, responsive to the system determining that the sum of the quantity of computational units of the remaining ECUs fails to exceed the threshold, switches from operating the vehicle in the nominal autonomous operational mode to operating the vehicle in a degraded autonomous operational mode.

13 Claims, 5 Drawing Sheets

Related U.S. Application Data

(60) Provisional application No. 62/760,575, filed on Nov. 13, 2018.

(56) References Cited

U.S. PATENT DOCUMENTS

| | | | | |
|---|---|---|---|---|
| 11,511,762 | B2 | 11/2022 | Huang et al. | |
| 2003/0089534 | A1* | 5/2003 | Kanzler | B62D 11/003 |
| | | | | 180/6.2 |
| 2008/0046142 | A1* | 2/2008 | Jordan | H04L 12/40195 |
| | | | | 701/36 |
| 2008/0118244 | A1* | 5/2008 | Nakada | H04J 3/14 |
| | | | | 398/59 |
| 2011/0077795 | A1* | 3/2011 | VanGilder | G06F 1/206 |
| | | | | 700/300 |
| 2011/0241862 | A1 | 10/2011 | Debouk et al. | |
| 2011/0289327 | A1* | 11/2011 | Nolterieke | G06F 1/3287 |
| | | | | 713/300 |
| 2015/0274027 | A1* | 10/2015 | Crombez | B60L 58/12 |
| | | | | 903/903 |
| 2016/0231796 | A1 | 8/2016 | Wade | |
| 2016/0250944 | A1* | 9/2016 | Christ | B60L 15/2045 |
| | | | | 701/22 |
| 2017/0234689 | A1 | 8/2017 | Gibson et al. | |
| 2018/0229738 | A1 | 8/2018 | Nilsson et al. | |
| 2018/0259966 | A1 | 9/2018 | Long | |
| 2019/0077446 | A1* | 3/2019 | Savin | B62D 5/0403 |
| 2019/0100105 | A1 | 4/2019 | Liu et al. | |
| 2019/0100237 | A1 | 4/2019 | Klesing | |
| 2019/0171205 | A1 | 6/2019 | Kudanowski | |
| 2019/0220454 | A1 | 7/2019 | Matsui et al. | |
| 2019/0324450 | A1* | 10/2019 | Lurie | H04L 12/40026 |
| 2020/0007464 | A1* | 1/2020 | Lo | H04L 9/0894 |
| 2021/0224169 | A1 | 7/2021 | Kang et al. | |
| 2022/0057798 | A1 | 2/2022 | Costin et al. | |

OTHER PUBLICATIONS

European Extended Search Report dated Nov. 28, 2022 for corresponding EP Patent Application No. 19885533.0.

* cited by examiner

200

VEHICULAR CONTROL SYSTEM HAVING A PLURALITY OF ELECTRONIC CONTROL UNITS

CROSS REFERENCE TO RELATED APPLICATIONS

This application is a continuation of U.S. patent application Ser. No. 16/682,644, filed Nov. 13, 2019, now U.S. Pat. No. 11,511,762, which claims the benefit of U.S. Provisional Application Ser. No. 62/760,575, filed on Nov. 13, 2018, the entire contents of which are incorporated herein by reference.

TECHNICAL FIELD

This disclosure relates to redundancy plans and, more particularly, to redundancy plans for use in autonomous vehicles.

BACKGROUND

As transportation moves towards autonomous (i.e., driverless) vehicles, the manufactures and designers of these autonomous vehicle must define contingencies that occur in the event of a failure of one or more of the systems within these autonomous vehicles.

As is known, autonomous vehicles contain multiple electronic control units (ECUs), wherein each of these ECUs may perform a specific function. For example, these various ECUs may calculate safe trajectories for the vehicle (e.g., for navigating the vehicle to its intended destination) and may provide control signals to the vehicle's actuators, propulsions systems and braking systems. Typically, one ECU (e.g., an Autonomy Control Unit) may be responsible for planning and calculating a trajectory for the vehicle, and may provide commands to other ECUs that may cause the vehicle to move (e.g., by controlling steering, braking, and powertrain ECUs).

Unfortunately, it is possible for one or more of these ECUs to fail. However and if other ECUs are still functioning, it may be desirable for the functioning ECUs to allow the autonomous vehicle to continue to operate.

SUMMARY OF DISCLOSURE

In one implementation, a computer-implemented method is executed on a computing device and includes: operating an autonomous vehicle; monitoring the operation of a plurality of computing devices within the autonomous vehicle; and in response to detecting the failure of one or more of the plurality of computing devices, switching the autonomous vehicle from a nominal autonomous operational mode to a degraded autonomous operational mode.

One or more of the following features may be included. The nominal autonomous operational mode may include one or more of: operating the autonomous vehicle up to a full operational speed; utilizing a full obstacle detection range; allowing passing maneuvers; allowing unprotected turns across traffic; processing certain sensor data; allowing the use of higher risk routes; allowing the use of less-connected routes; allowing the use of routes lacking breakdown lanes/ areas; utilizing a narrower definition of an obstacle to allow higher speed operation; and allowing the use of smaller buffers with respect to obstacles. The degraded autonomous operational mode may include one or more of: operating the autonomous vehicle up to a degraded operational speed;

utilizing a degraded obstacle detection range; prohibiting passing maneuvers; prohibiting unprotected turns across traffic; not processing certain sensor data; prohibiting the use of higher risk routes; prohibiting the use of less-connected routes; prohibiting the use of routes lacking breakdown lanes/areas; utilizing a broader definition of an obstacle to require lower speed operation; requiring the use of larger buffers with respect to obstacles; requiring the vehicle to safely pull off of the road; and requiring the vehicle to call for assistance. A larger portion of the plurality of computing devices may be capable of operating the autonomous vehicle in the nominal autonomous operational mode. A smaller portion of the plurality of computing devices may be incapable of operating the autonomous vehicle in the nominal autonomous operational mode. The smaller portion of the plurality of computing devices may be capable of operating the autonomous vehicle in the degraded autonomous operational mode. The larger portion of the plurality of computing devices capable of operating the autonomous vehicle in the nominal autonomous operational mode may include all of the plurality of computing devices within the autonomous vehicle. The larger portion of the plurality of computing devices capable of operating the autonomous vehicle in the nominal autonomous operational mode may include some, but not all, of the plurality of computing devices within the autonomous vehicle. The autonomous vehicle may include a plurality of sensors. All of the plurality of sensors may be coupled to all of the plurality of computing devices. A first portion of the plurality of sensors may be coupled to a first computing system within the plurality of computing devices and at least a second portion of the plurality of sensors may be coupled to at least a second computing system within the plurality of computing devices.

In another implementation, a computer program product resides on a computer readable medium and has a plurality of instructions stored on it. When executed by a processor, the instructions cause the processor to perform operations including operating an autonomous vehicle; monitoring the operation of a plurality of computing devices within the autonomous vehicle; and in response to detecting the failure of one or more of the plurality of computing devices, switching the autonomous vehicle from a nominal autonomous operational mode to a degraded autonomous operational mode.

One or more of the following features may be included. The nominal autonomous operational mode may include one or more of: operating the autonomous vehicle up to a full operational speed; utilizing a full obstacle detection range; allowing passing maneuvers; allowing unprotected turns across traffic; processing certain sensor data; allowing the use of higher risk routes; allowing the use of less-connected routes; allowing the use of routes lacking breakdown lanes/ areas; utilizing a narrower definition of an obstacle to allow higher speed operation; and allowing the use of smaller buffers with respect to obstacles. The degraded autonomous operational mode may include one or more of: operating the autonomous vehicle up to a degraded operational speed; utilizing a degraded obstacle detection range; prohibiting passing maneuvers; prohibiting unprotected turns across traffic; not processing certain sensor data; prohibiting the use of higher risk routes; prohibiting the use of less-connected routes; prohibiting the use of routes lacking breakdown lanes/areas; utilizing a broader definition of an obstacle to require lower speed operation; requiring the use of larger buffers with respect to obstacles; requiring the vehicle to safely pull off of the road; and requiring the vehicle to call for assistance. A larger portion of the plurality of computing devices may be capable of operating the autonomous vehicle in the nominal autonomous operational mode. A smaller portion of the plurality of computing devices may be incapable of operating the autonomous vehicle in the nominal autonomous operational mode. The smaller portion of the plurality of computing devices may be capable of operating the autonomous vehicle in the degraded autonomous operational mode. The larger portion of the plurality of computing devices capable of operating the autonomous vehicle in the nominal autonomous operational mode may include all of the plurality of computing devices within the autonomous vehicle. The larger portion of the plurality of computing devices capable of operating the autonomous vehicle in the nominal autonomous operational mode may include some, but not all, of the plurality of computing devices within the autonomous vehicle. The autonomous vehicle may include a plurality of sensors. All of the plurality of sensors may be coupled to all of the plurality of computing devices. A first portion of the plurality of sensors may be coupled to a first computing system within the plurality of computing devices and at least a second portion of the plurality of sensors may be coupled to at least a second computing system within the plurality of computing devices.

In another implementation, a computing system includes a processor and memory is configured to perform operations including operating an autonomous vehicle; monitoring the operation of a plurality of computing devices within the autonomous vehicle; and in response to detecting the failure of one or more of the plurality of computing devices, switching the autonomous vehicle from a nominal autonomous operational mode to a degraded autonomous operational mode.

One or more of the following features may be included. The nominal autonomous operational mode may include one or more of: operating the autonomous vehicle up to a full operational speed; utilizing a full obstacle detection range; allowing passing maneuvers; allowing unprotected turns across traffic; processing certain sensor data; allowing the use of higher risk routes; allowing the use of less-connected routes; allowing the use of routes lacking breakdown lanes/ areas; utilizing a narrower definition of an obstacle to allow higher speed operation; and allowing the use of smaller buffers with respect to obstacles. The degraded autonomous operational mode may include one or more of: operating the autonomous vehicle up to a degraded operational speed; utilizing a degraded obstacle detection range; prohibiting passing maneuvers; prohibiting unprotected turns across traffic; not processing certain sensor data; prohibiting the use of higher risk routes; prohibiting the use of less-connected routes; prohibiting the use of routes lacking breakdown lanes/areas; utilizing a broader definition of an obstacle to require lower speed operation; requiring the use of larger buffers with respect to obstacles; requiring the vehicle to safely pull off of the road; and requiring the vehicle to call for assistance. A larger portion of the plurality of computing devices may be capable of operating the autonomous vehicle in the nominal autonomous operational mode. A smaller portion of the plurality of computing devices may be incapable of operating the autonomous vehicle in the nominal autonomous operational mode. The smaller portion of the plurality of computing devices may be capable of operating the autonomous vehicle in the degraded autonomous operational mode. The larger portion of the plurality of computing devices capable of operating the autonomous vehicle in the nominal autonomous operational mode may include all of the plurality of computing devices within the autonomous vehicle. The larger portion of the plurality of computing devices capable of operating the autonomous vehicle in the nominal autonomous operational mode may include some, but not all, of the plurality of computing devices within the autonomous vehicle. The autonomous vehicle may include a plurality of sensors. All of the plurality of sensors may be coupled to all of the plurality of computing devices. A first portion of the plurality of sensors may be coupled to a first computing system within the plurality of computing devices and at least a second portion of the plurality of sensors may be coupled to at least a second computing system within the plurality of computing devices.

The details of one or more implementations are set forth in the accompanying drawings and the description below. Other features and advantages will become apparent from the description, the drawings, and the claims.

BRIEF DESCRIPTION OF THE DRAWINGS

Like reference symbols in the various drawings indicate like elements.

DETAILED DESCRIPTION OF THE PREFERRED EMBODIMENTS

Autonomous Vehicle Overview

Figure 1:
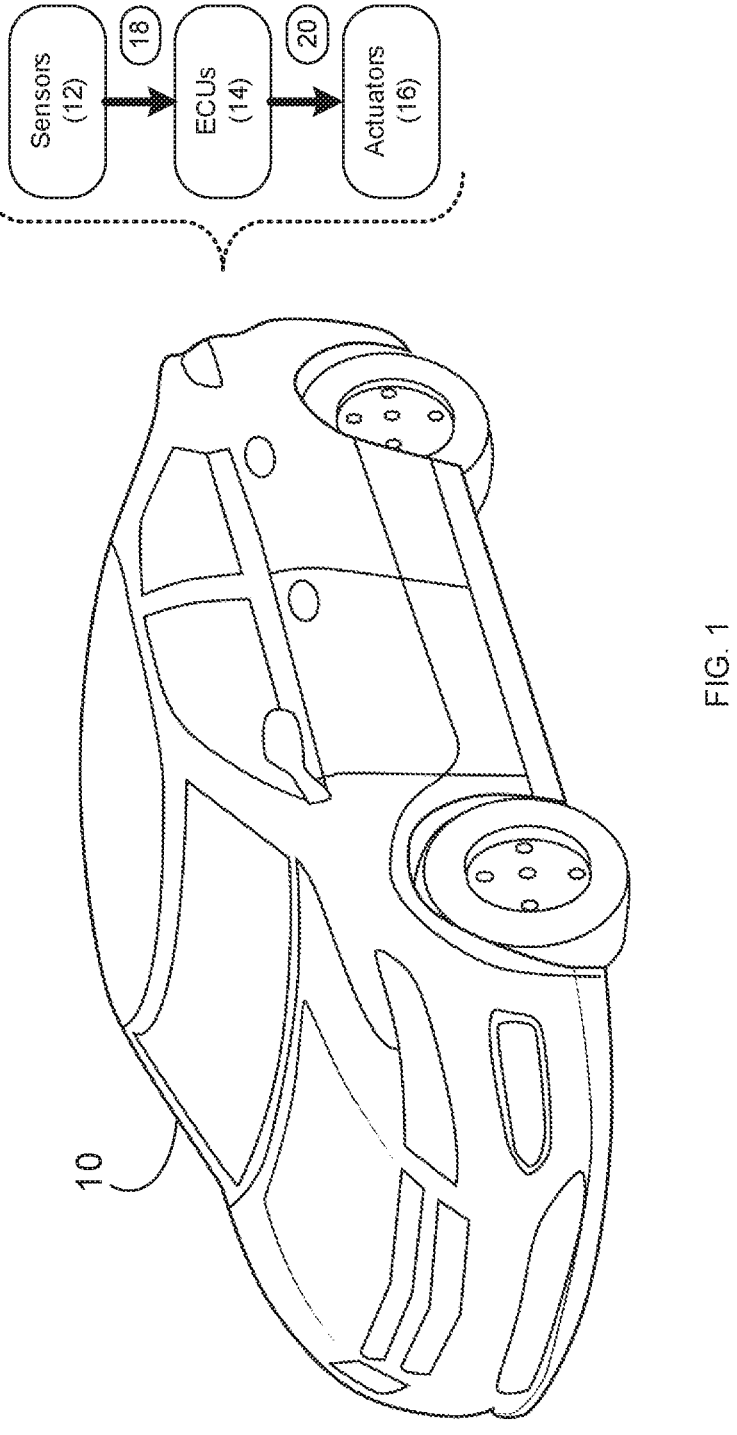
FIG. 1 is a diagrammatic view of an autonomous vehicle according to an embodiment of the present disclosure.

Referring to FIG. 1, there is shown autonomous vehicle 10. As is known in the art, an autonomous vehicle (e.g. autonomous vehicle 10) is a vehicle that is capable of sensing its environment and moving with little or no human input. Autonomous vehicles (e.g. autonomous vehicle 10) may combine a variety of sensor systems to perceive their surroundings, examples of which may include but are not limited to radar, computer vision, LIDAR, GPS, odometry, temperature and inertial, wherein such sensor systems may be configured to interpret lanes and markings on a roadway, street signs, stoplights, pedestrians, other vehicles, roadside objects, hazards, etc.

Autonomous vehicle 10 may include a plurality of sensors (e.g. sensors 12), a plurality of electronic control units (e.g. ECUs 14) and a plurality of actuators (e.g. actuators 16). Accordingly, sensors 12 within autonomous vehicle 10 may monitor the environment in which autonomous vehicle 10 is operating, wherein sensors 12 may provide sensor data 18 to ECUs 14. ECUs 14 may process sensor data 18 to determine the manner in which autonomous vehicle 10 should move.

ECUs 14 may then provide control data 20 to actuators 16 so that autonomous vehicle 10 may move in the manner decided by ECUs 14. For example, a machine vision sensor included within sensors 12 may "read" a speed limit sign stating that the speed limit on the road on which autonomous vehicle 10 is traveling is now 35 miles an hour. This machine vision sensor included within sensors 12 may provide sensor data 18 to ECUs 14 indicating that the speed limit on the road on which autonomous vehicle 10 is traveling is now 35 mph. Upon receiving sensor data 18, ECUs 14 may process sensor data 18 and may determine that autonomous vehicle 10 (which is currently traveling at 45 mph) is traveling too fast and needs to slow down. Accordingly, ECUs 14 may provide control data 20 to actuators 16, wherein control data 20 may e.g. apply the brakes of autonomous vehicle 10 or eliminate any actuation signal currently being applied to the accelerator (thus allowing autonomous vehicle 10 to coast until the speed of autonomous vehicle 10 is reduced to 35 mph).

System Redundancy

As would be imagined, since autonomous vehicle 10 is being controlled by the various electronic systems included therein (e.g. sensors 12, ECUs 14 and actuators 16), the potential failure of one or more of these systems should be considered when designing autonomous vehicle 10 and appropriate contingency plans may be employed.

Figure 2A:
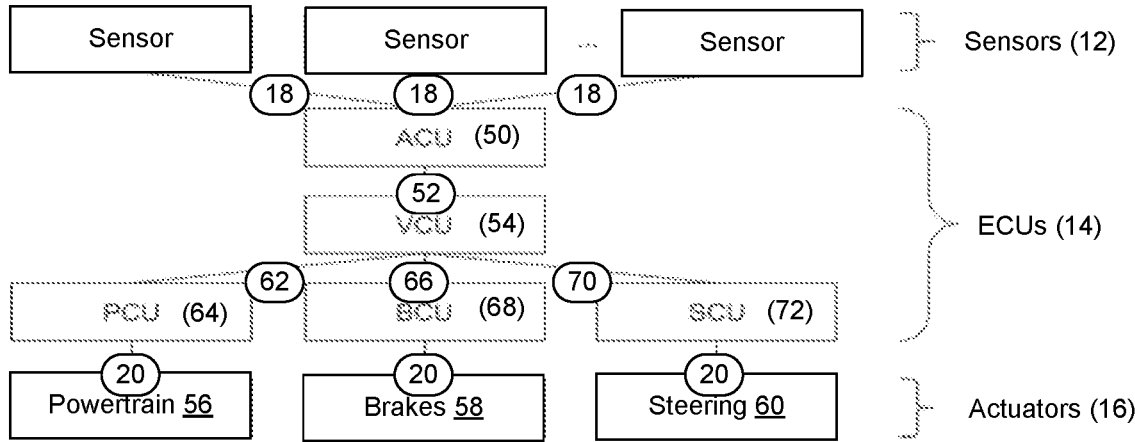
FIG. 2A is a diagrammatic view of one embodiment of the various systems included within the autonomous vehicle of FIG. 1 according to an embodiment of the present disclosure.

For example and referring also to FIG. 2A, the various ECUs (e.g., ECUs 14) that are included within autonomous vehicle 10 may be compartmentalized so that the responsibilities of the various ECUs (e.g., ECUs 14) may be logically grouped. For example, ECUs 14 may include autonomy control unit 50 that may receive sensor data 18 from sensors 12.

Autonomy control unit 50 may be configured to perform various functions. For example, autonomy control unit 50 may receive and process exteroceptive sensor data (e.g., sensor data 18), may estimate the position of autonomous vehicle 10 within its operating environment, may calculate a representation of the surroundings of autonomous vehicle 10, may compute safe trajectories for autonomous vehicle 10, and may command the other ECUs (in particular, a vehicle control unit) to cause autonomous vehicle 10 to execute a desired maneuver. Autonomy control unit 50 may include substantial compute power, persistent storage, and memory.

Accordingly, autonomy control unit 50 may process sensor data 18 to determine the manner in which autonomous vehicle 10 should be operating. Autonomy control unit 50 may then provide vehicle control data 52 to vehicle control unit 54, wherein vehicle control unit 54 may then process vehicle control data 52 to determine the manner in which the individual control systems (e.g. powertrain system 56, braking system 58 and steering system 60) should respond in order to achieve the trajectory defined by autonomy control unit 50 within vehicle control data 52.

Vehicle control unit 54 may be configured to control other ECUs included within autonomous vehicle 10. For example, vehicle control unit 54 may control the steering, powertrain, and brake controller units. For example, vehicle control unit 54 may provide: powertrain control signal 62 to powertrain control unit 64; braking control signal 66 to braking control unit 68; and steering control signal 70 to steering control unit 72.

Powertrain control unit 64 may process powertrain control signal 62 so that the appropriate control data (commonly represented by control data 20) may be provided to powertrain system 56. Additionally, braking control unit 68 may process braking control signal 66 so that the appropriate control data (commonly represented by control data 20) may be provided to braking system 58. Further, steering control unit 72 may process steering control signal 70 so that the appropriate control data (commonly represented by control data 20) may be provided to steering system 60.

Powertrain control unit 64 may be configured to control the transmission (not shown) and engine/traction motor (not shown) within autonomous vehicle 10; while brake control unit 68 may be configured to control the mechanical/regenerative braking system (not shown) within autonomous vehicle 10; and steering control unit 72 may be configured to control the steering column I steering rack (not shown) within autonomous vehicle 10.

Autonomy control unit 50 may be a highly complex computing system that may provide extensive processing capabilities (e.g., a workstation-class computing system with multi-core processors, discrete co-processing units, gigabytes of memory, and persistent storage). In contrast, vehicle control unit 54 may be a much simpler device that may provide processing power equivalent to the other ECUs included within autonomous vehicle 10 (e.g., a computing system having a modest microprocessor (with a CPU frequency of less than 200 megahertz), less than 1 megabyte of system memory, and no persistent storage). Due to these simpler designs, vehicle control unit 54 may have greater reliability and durability than autonomy control unit 50.

To further enhance redundancy and reliability, one or more of the ECUs (ECUs 14) included within autonomous vehicle 10 may be configured in a redundant fashion. For example in referring also to FIG. 2B, there is shown one implementation of ECUs 14 wherein a plurality of vehicle control units are utilized. For example, this particular implementation is shown to include two vehicle control units, namely a first vehicle control unit (e.g., vehicle control unit 54) and a second vehicle control unit (e.g., vehicle control unit 74).

In this particular configuration, the two vehicle control units (e.g. vehicle control units 54, 74) may be configured in various ways. For example, the two vehicle control units (e.g. vehicle control units 54, 74) may be configured in an active—passive configuration, wherein e.g. vehicle control unit 54 performs the active role of processing vehicle control data 52 while vehicle control unit 74 assumes a passive role and is essentially in standby mode. In the event of a failure of vehicle control unit 54, vehicle control unit 74 may transition from a passive role to an active role and assume the role of processing vehicle control data 52. Alternatively, the two vehicle control units (e.g. vehicle control units 54, 74) may be configured in an active—active configuration, wherein e.g. both vehicle control unit 52 and vehicle control unit 74 perform the active role of processing vehicle control data 52 (e.g. divvying up the workload), wherein in the event of a failure of either vehicle control unit 54 or vehicle control unit 74, the surviving vehicle control unit may process all of vehicle control data 52.

Figure 2B:
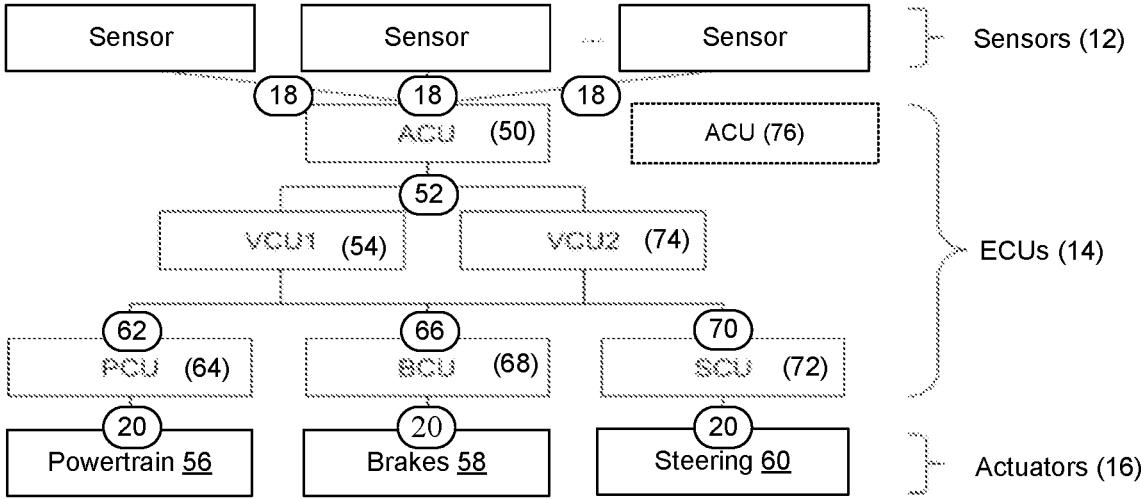
FIG. 2B is a diagrammatic view of another embodiment of the various systems included within the autonomous vehicle of FIG. 1 according to an embodiment of the present disclosure.

While FIG. 2B illustrates one example of the manner in which the various ECUs (e.g. ECUs 14) included within autonomous vehicle 10 may be configured in a redundant fashion, this is for illustrative purposes only and is not intended to be a limitation of this disclosure, as other configurations are possible and are considered to be within the scope of this disclosure. For example, autonomy control unit 50 may be configured in a redundant fashion, wherein a second autonomy control unit (e.g., autonomy control unit 76) is included within autonomous vehicle 10 and is configured in an active—passive or active—active fashion.

Figure 3:
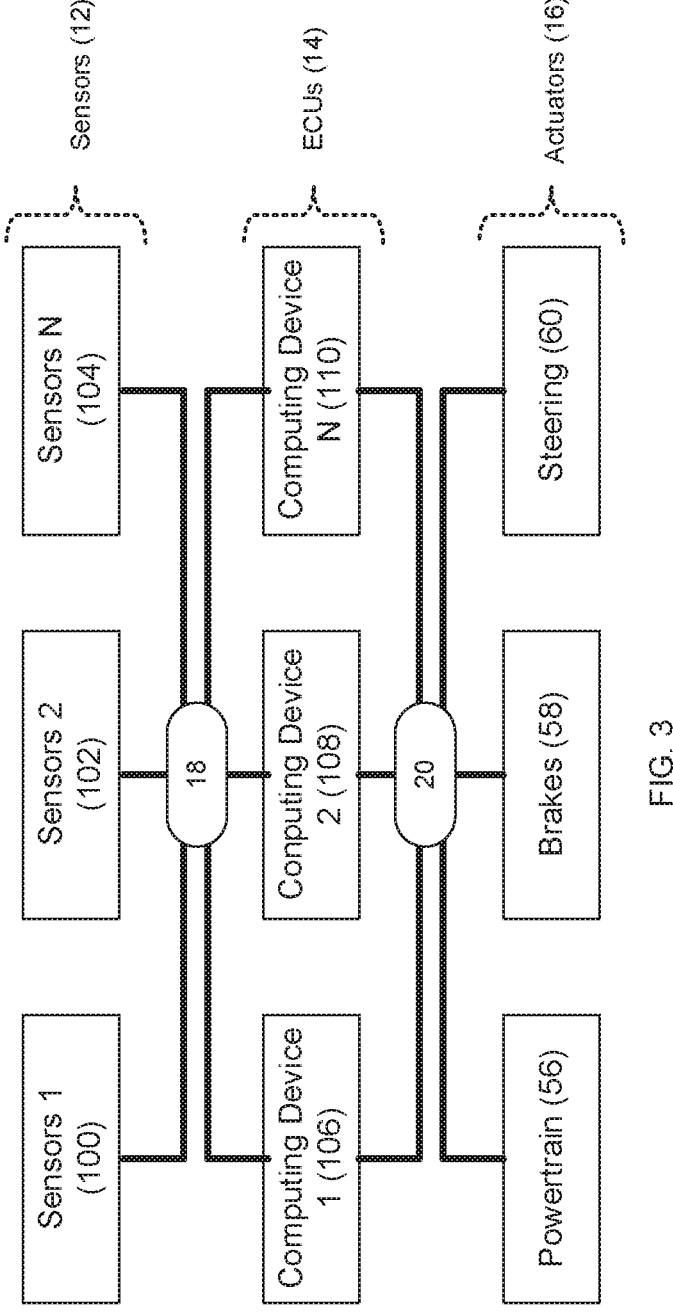
FIG. 3 is a diagrammatic view of another embodiment of the various systems included within the autonomous vehicle of FIG. 1 according to an embodiment of the present disclosure.

It is foreseeable that one or more of the sensors (e.g., sensors 12) may be configured in a redundant fashion. Accordingly, it is understood that the level of redundancy achievable with respect to autonomous vehicle 10 may only be limited by the design criteria and budget constraints of autonomous vehicle 10. For example and referring also to FIG. 3, sensors 12 may be divided into a plurality of sensor groups (e.g., sensor groups 100, 102, 104), wherein each of these sensor groups may be provided to a different computing device (included within ECUs 14). For example, sensor group 100 may be coupled to (and provided to) computing device 106; sensor group 102 may be coupled to (and provided to) computing device 108; and sensor group 104 may be coupled to (and provided to) computing device 110. In such a configuration, the wiring harness that couples the sensors to the computing device is the simplest (and the least expensive) . . . but the number of sensors required is the greatest (and the most expensive). Alternatively, a single group of sensors (e.g., sensor group 100 may be coupled to (and provided to) a plurality of computing devices (e.g., computing device 106, computing device 108 and computing device 110). In such a configuration, the number of sensors required is the fewest (and the least expensive) . . . but the wiring harness that couples the sensors to the computing devices is the most complex (and the most expensive).

Autonomy Computational Subsystems

Figure 4:
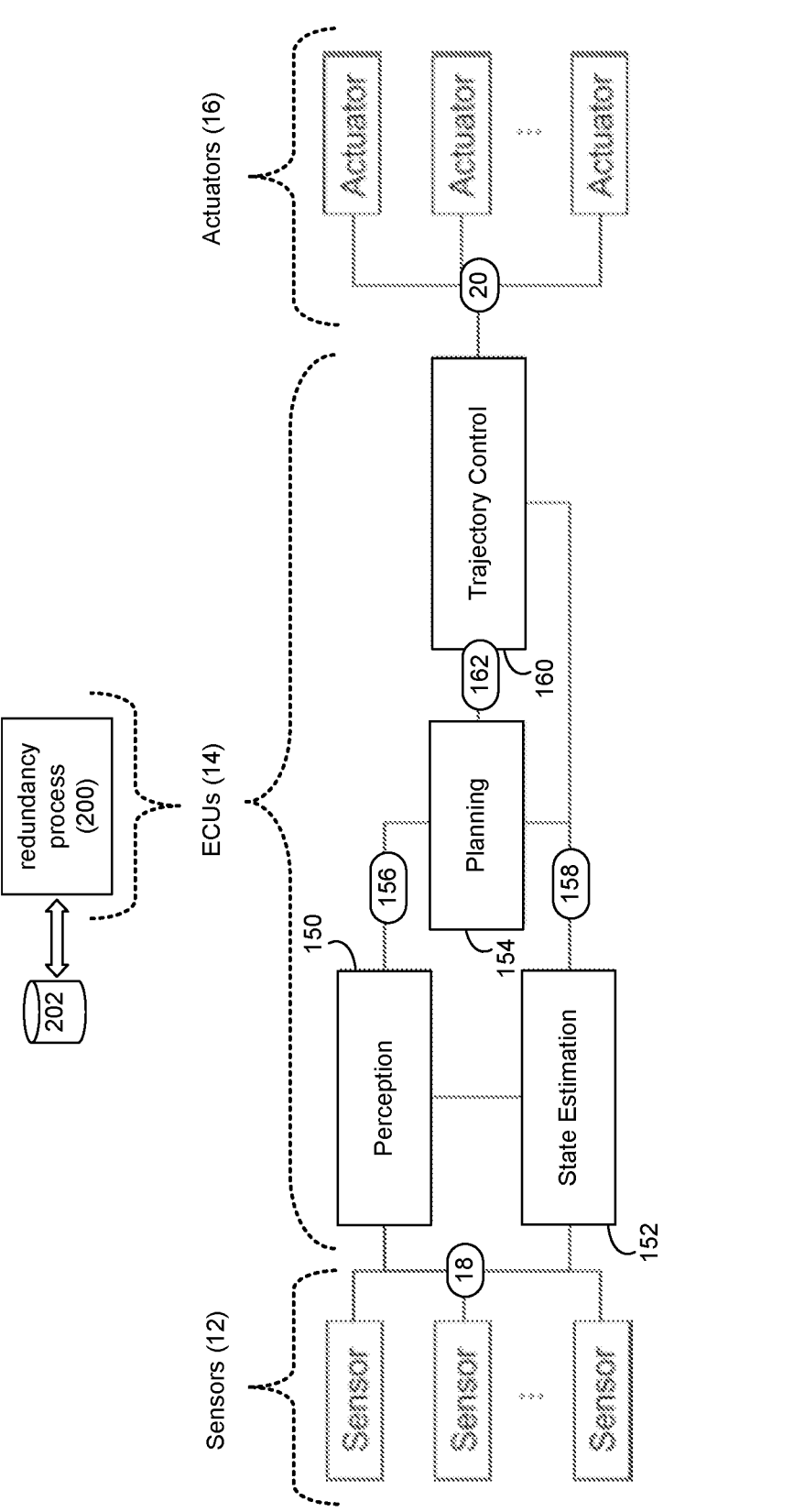
FIG. 4 is a diagrammatic view of another embodiment of the various systems included within the autonomous vehicle of FIG. 1 according to an embodiment of the present disclosure.

Referring also to FIG. 4, the various ECUs of autonomous vehicle 10 may be grouped/arranged/configured to effectuate various functionalities. For example, one or more of ECUs 14 may be configured to effectuate/form perception subsystem 150. wherein perception subsystem 150 may be configured to process data from onboard sensors (e.g., sensor data 18) to calculate concise representations of objects of interest near autonomous vehicle 10 (examples of which may include but are not limited to other vehicles, pedestrians, traffic signals, traffic signs, road markers, hazards, etc.) and to identify environmental features that may assist in determining the location of autonomous vehicle 10. Further, one or more of ECUs 14 may be configured to effectuate/form state estimation subsystem 152, wherein state estimation subsystem 152 may be configured to process data from onboard sensors (e.g., sensor data 18) to estimate the position, orientation, and velocity of autonomous vehicle 10 within its operating environment. Additionally, one or more of ECUs 14 may be configured to effectuate/form planning subsystem 154, wherein planning subsystem 154 may be configured to calculate a desired vehicle trajectory (using perception output 156 and state estimation output 158). Further still, one or more of ECUs 14 may be configured to effectuate/form trajectory control subsystem 160, wherein trajectory control subsystem 160 may use planning output 162 and state estimation output 158 (in conjunction with feedback and/or feedforward control techniques) to calculate actuator commands (e.g., control data 20) that may cause autonomous vehicle 10 to execute its intended trajectory within it operating environment.

For redundancy purposes, the above-described subsystems may be distributed across various devices (e.g., autonomy control unit 50 and vehicle control units 54, 74). Additionally/alternatively and due to the increased computational requirements, perception subsystem 150 and planning subsystem 154 may be located almost entirely within autonomy control unit 50, which (as discussed above) has much more computational horsepower than vehicle control units 54, 74. Conversely and due to their lower computational requirements, state estimation subsystem 152 and trajectory control subsystem 160 may be: located entirely on vehicle control units 54, 74 if vehicle control units 54, 74 have the requisite computational capacity; and/or are located partially on vehicle control units 54, 74 and partially on autonomy control unit 50.

Trajectory Calculation

During typical operation of autonomous vehicle 10, the autonomy subsystems described above repeatedly perform the following functionalities:

Measuring the surrounding environment using on-board sensors (e.g. using sensors 12);

Estimating the positions, velocities, and future trajectories of surrounding vehicles, pedestrians, cyclists, and other objects near autonomous vehicle TO, and environmental features useful for location determination (e.g., using perception subsystem 150);

Estimating the position, orientation, and velocity of autonomous vehicle I0 within the operating environment (e.g., using state estimation subsystem 152);

Planning a nominal trajectory for autonomous vehicle IO to follow that brings autonomous vehicle IO closer to the intended destination of autonomous vehicle 10 (e.g., using planning subsystem 154); and Generating commands (e.g., control data 20) to cause autonomous vehicle 10 to execute the intended trajectory (e.g., using trajectory control subsystem 160)

During each iteration, planning subsystem 154 may calculate a trajectory that may span travel of many meters (in distance) and many seconds (in time). However, each iteration of the above-described loop may be calculated much more frequently (e.g., every ten milliseconds). Accordingly, autonomous vehicle 10 may be expected to execute only a small portion of each planned trajectory before a new trajectory is calculated (which may differ from the previously-calculated trajectories due to e.g., sensed environmental changes).

Trajectory Execution

The above-described trajectory may be represented as a parametric curve that describes the desired future path of autonomous vehicle 10. There may be two major classes of techniques for controlling autonomous vehicle 10 while executing the above-described trajectory: a) feedforward control and b) feedback control.

Under nominal conditions, a trajectory is executed using feedback control, wherein feedback trajectory control algorithms may use e.g., a kinodynamic model of autonomous vehicle 10, per-vehicle configuration parameters, and a continuously-calculated estimate of the position, orientation, and velocity of autonomous vehicle 10 to calculate the commands that are provided to the various ECUs included within autonomous vehicle 10.

Feedforward trajectory control algorithms may use a kinodynamic model of autonomous vehicle 10, per-vehicle configuration parameters, and a single estimate of the initial position, orientation, and velocity of autonomous vehicle 10 to calculate a sequence of commands that are provided to the various ECUs included within autonomous vehicle 10, wherein the sequence of commands are executed without using any real-time sensor data (e.g. from sensors 12) or other information.

To execute the above-described trajectories, autonomy control unit 50 may communicate with (and may provide commands to) the various ECUs, using vehicle control unit 54/74 as an intermediary. At each iteration of the above-described trajectory execution loop, autonomy control unit 50 may calculate steering, powertrain, and brake commands that are provided to their respective ECUs (e.g., powertrain control unit 64, braking control unit 68, and steering control unit 72; respectively), and may transmit these commands to vehicle control unit 54/74. Vehicle control unit 54/74 may then validate these commands and may relay them to the various ECUs (e.g., powertrain control unit 64, braking control unit 68, and steering control unit 72; respectively).

Redundancy Process:

As discussed above and as will be discussed below in greater detail, ECUs 14 may be configured to operate in a redundant fashion, wherein autonomous vehicle 10 may be capable of continued operation even if one or more of ECUs 14 fails. In order to provide such continued operation after such a failure, one or more of ECUs 14 may execute redundancy process 200. Redundancy process 200 may be executed on a single ECU or may be executed collaboratively across multiple ECUs. For example, redundancy process 110 may be executed solely by an autonomy control unit (e.g., autonomy control unit 50 or autonomy control unit 76) or a vehicle control unit (e.g., vehicle control unit 54 or vehicle control unit 74). Alternatively, redundancy process 200 may be executed collaboratively across the combination of one or more autonomy control units (e.g., autonomy control unit 50 and/or autonomy control unit 76) and/or one or more vehicle control units (e.g., vehicle control unit 54 and/or vehicle control unit 74). Accordingly and in the latter configuration, in the event of a failure of one or more of the autonomy control units (e.g., autonomy control unit 50 and/or autonomy control unit 76) and/or one or more of the vehicle control units (e.g., vehicle control unit 54 and/or vehicle control unit 74), the surviving control unit(s) may continue to execute redundancy process 200.

The instruction sets and subroutines of redundancy process 200, which may be stored on storage device 202 coupled to ECUs 14, may be executed by one or more processors (not shown) and one or more memory architectures (not shown) included within ECUs 14. Examples of storage device 202 may include but are not limited to: a hard disk drive; a RAID device; a random access memory (RAM); a read-only memory (ROM); and all forms of flash memory storage devices.

Figure 5:
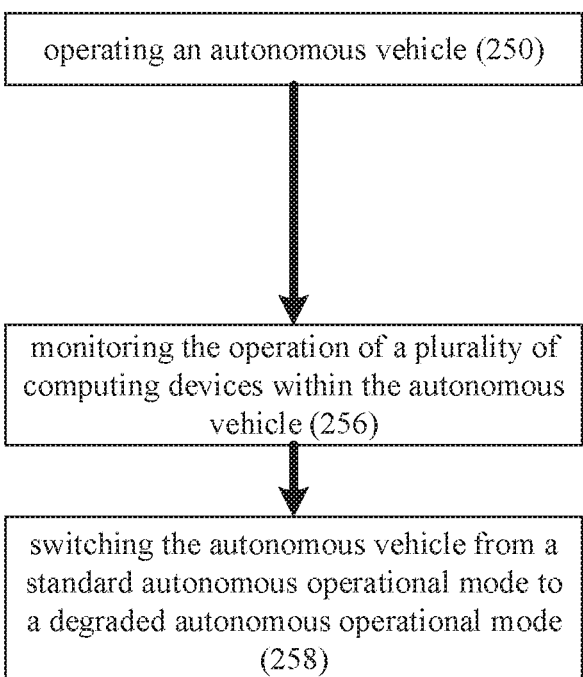
FIG. 5 is a flowchart of a contingency plan process executed on one or more systems of the autonomous vehicle of FIG. 1 according to an embodiment of the present disclosure.

Referring also to FIG. 5, redundancy process 200 may operate 250 autonomous vehicle 10 in the manner described above, wherein operating 250 autonomous vehicle 10 may include:

operating autonomous vehicle 10 in a nominal autonomous operational mode; and operating autonomous vehicle 10 in a degraded autonomous operational mode.

The following table illustrates one possible example of some of the criteria that may differentiate the nominal autonomous operational mode of autonomous vehicle 10 from the degraded autonomous operational mode of autonomous vehicle 10.

|  | Nominal | Degraded |
| --- | --- | --- |
| fv1aximum vehicle speed | 40 km/h | 20 km/h |
| Obstacle detection range | •1 som | 80 m |
| Execute passing maneuvers | Yes | No |
| Make unprotected left turns | Yes | No |
| Process RADAR data | Yes | No |
| Process LID.AH data | Yes | Yes |

Accordingly and in this example, transitioning from a nominal autonomous operational mode to a degraded autonomous operational mode for autonomous vehicle 10 may result in e.g.,:

a reduction in the maximum vehicle operating speed of autonomous vehicle 10;

a reduction in the obstacle detection range of autonomous vehicle 10;

the suspension of passing maneuvers for autonomous vehicle 10;

the suspension of unprotected turns across traffic for autonomous vehicle 10; and the suspension of the processing of certain sensor data by autonomous vehicle 10. For example, certain complex data signals (e.g., RADAR, LIDAR and/or camera data) may not be processed due to reduced computational capabilities.

The above-embedded table is for illustrative purposes only and is not intended to be all inclusive. Accordingly and understandably, other criteria may be considered/utilized with respect to differentiating between nominal autonomous operational mode and degraded autonomous operational mode.

Accordingly and with respect to nominal autonomous operational mode of autonomous vehicle 10, nominal autonomous operational mode may:

allow the use of higher risk routes;

allow the use of less-connected routes;

allow the use of routes lacking breakdown lanes/areas;

utilize a narrower definition of an obstacle to allow higher speed operation; and allow the use of smaller buffers with respect to obstacles.

Further and with respect to degraded autonomous operational mode of autonomous vehicle 10, degraded autonomous operational mode may:

prohibit the use of higher risk routes;

prohibit the use of less-connected routes;

prohibit the use of routes lacking breakdown lanes/areas;

utilize a broader definition of an obstacle to require lower speed operation;

require the use of larger buffers with respect to obstacles;

require the vehicle to safely pull off of the road; and require the vehicle to call for assistance.

While operating 250 autonomous vehicle 10, redundancy process 200 may monitor 256 the operation of a plurality of computing devices within the autonomous vehicle (e.g., autonomous vehicle 10). For example, redundancy process 200 may monitor 256 the operation of any one of ECUs 14. Accordingly, redundancy process 200 may monitor (in this example) 256 the operation of autonomy control unit 50, autonomy control unit 76, vehicle control unit 54 and/or vehicle control unit 74 to confirm that these devices are operational (i.e., have not fully or partially failed).

In response to detecting the failure of one or more of the plurality of computing devices (e.g., one or more of ECUs 14), redundancy process 200 may switch 258 the autonomous vehicle (e.g., autonomous vehicle 10) from the nominal autonomous operational mode to the degraded autonomous operational mode (examples of which are provided in the above-embedded table).

As discussed above, autonomy control units 50, 76 may be a highly complex computing systems that may provide extensive processing capabilities (e.g., a workstation-class computing system with multi-core processors, discrete co-processing units, gigabytes of memory, and persistent storage). In contrast, vehicle control units 54, 74 may be much simpler devices that may provide processing power equivalent to the other ECUs included within autonomous vehicle 10 (e.g., a computing system having a modest microprocessor (with a CPU frequency of less than 200 megahertz), less than 1 megabyte of system memory, and no persistent storage).

For illustrative purposes, assume that ECUs 14 within autonomous vehicle 10 are configured in a quasi-redundant mode. For example, assume for illustrative purposes that it takes 100 computational units to operate autonomous vehicle 10 in nominal autonomous operational mode. Further, assume for illustrative purposes that it takes 50 computational units to operate autonomous vehicle 10 in degraded autonomous operational mode. Therefore and for full redundancy, autonomous vehicle 10 may need to include multiple computing devices that are each capable of providing 100 computational units so that, if one computing device fails, another computing device may provide the 100 computational units required for autonomous vehicle 10 to continue operation in nominal autonomous operational mode. However, if continued operation in degraded autonomous operational mode (as opposed to nominal autonomous operational mode) is acceptable, a plurality of less powerful computing devices may be utilized within autonomous vehicle 10 (as will be explained below in greater detail).

Again, assume that it takes 100 computational units to operate autonomous vehicle IO in nominal autonomous operational mode and 50 computational units to operate autonomous vehicle IO in degraded autonomous operational mode. Further, assume that ECUs 14 include redundant computing devices. For example, these redundant computing devices may be redundant autonomy control units, redundant vehicle control units, redundant powertrain control units, redundant braking control units and/or redundant steering control units.

Regardless of the particular type of unit and/or the particular quantity of units, autonomous vehicle 10 may be configured so that:

a larger portion of the plurality of computing devices may be capable of operating autonomous vehicle IO in the nominal autonomous operational mode; and a smaller portion of the plurality of computing devices may be incapable of operating autonomous vehicle 10 in the nominal autonomous operational mode; while the smaller portion of the plurality of computing devices may be capable of operating autonomous vehicle 10 in the degraded autonomous operational mode.

As will be explained below, this "larger portion" of the plurality of computing devices capable of operating autonomous vehicle 10 in the nominal autonomous operational mode may include all of the plurality of computing devices within autonomous vehicle 10. Alternatively and as will be discussed below, this "larger portion" of the plurality of computing devices capable of operating autonomous vehicle 10 in the nominal autonomous operational mode may include some, but not all, of the plurality of computing devices within autonomous vehicle 10.

Larger Portion Requires All:

Assume for this example that the redundant computing devices include two computing devices (e.g., computing devices 106, 108) that are each capable of providing 60 computational units. Accordingly, the combination of computing devices 106, 108 provides 120 computational units. Therefore, the combination of computing devices 106, 108 is capable of enabling autonomous vehicle IO to operate in nominal autonomous operational mode. However, in the event that one of computing devices 106, 108 fails, the remaining computing device (e.g., either computing devices 106 or computing device 108) can only provide 60 computational units; not enough to allow autonomous vehicle IO to operate in nominal autonomous operational mode (as that requires TOO computational units) but enough to allow autonomous vehicle IO to operate in degraded autonomous operational mode (as that requires 50 computational units).

Accordingly and in this example, anything less than all of the computing devices requires switching 258 the autonomous vehicle (e.g., autonomous vehicle 10) from the nominal autonomous operational mode to the degraded autonomous operational mode. Therefore, this "larger portion" of the plurality of computing devices capable of operating autonomous vehicle 10 in the nominal autonomous operational mode may require all (two in this example) of the plurality of computing devices within autonomous vehicle 10.

Larger Portion Requires Less-than-All:

Assume for this example that the redundant computing devices include three computing devices (e.g., computing devices 106, 108, 110) that are each capable of providing 60 computational units. Accordingly, the combination of computing devices 106, 108, 110 provides 180 computational units. Therefore, the combination of computing devices 106, 108, 110 is capable of enabling autonomous vehicle 10 to operate in nominal autonomous operational mode. Further, in the event that one of computing devices 106, 108, 110 fails, the remaining computing devices (either computing devices 106, 108; computing device 108, 110; or computing devices 106, 110) can still provide 120 computational units; enough to allow autonomous vehicle 10 to continue to operate in nominal autonomous operational mode (as that requires 100 computational units). However, in the event that an additional computing device fails (for a failure of two computing devices), the remaining computing device (either computing device 106, 108 or 110) can only provide 60 computational units; not enough to allow autonomous vehicle 10 to operate in nominal autonomous operational mode (as that requires 100 computational units) but enough to allow autonomous vehicle IO to operate in degraded autonomous operational mode (as that requires 50 computational units).

Accordingly and in this example, a failure of one computing device may be endured without needing to switch 258 the autonomous vehicle (e.g., autonomous vehicle 10) from the nominal autonomous operational mode to the degraded autonomous operational mode. However, a failure of multiple computing devices would require switching 258 the autonomous vehicle (e.g., autonomous vehicle 10) from the nominal autonomous operational mode to the degraded autonomous operational mode. Therefore, this "larger portion" of the plurality of computing devices capable of operating autonomous vehicle IO in the nominal autonomous operational mode may require some (two in this example), but not all (three in this example), of the plurality of computing devices within autonomous vehicle 10.

General

As will be appreciated by one skilled in the art, the present disclosure may be embodied as a method, a system, or a computer program product. Accordingly, the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present disclosure may take the form of a computer program product on a computer-usable storage medium having computer-usable program code embodied in the medium.

Any suitable computer usable or computer readable medium may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium may include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. The computer-usable or computer-readable medium may also be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to the Internet, wireline, optical fiber cable, RF, etc.

Computer program code for carrying out operations of the present disclosure may be written in an object oriented programming language such as Java, Smalltalk, C++ or the like. However, the computer program code for carrying out operations of the present disclosure may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network/a wide area network/the Internet (e.g., network 14).

The present disclosure is described with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, may be implemented by computer program instructions. These computer program instructions may be provided to a processor of a general purpose computer/special purpose computer/other programmable data processing apparatus, such that the instructions, which execute via the processor of the computer or other programmable data processing apparatus, create means for implementing the functions/acts specified in the flowchart and/or block diagram block or blocks.

These computer program instructions may also be stored m a computer-readable memory that may direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer-implemented process such that the instructions which execute on the computer or other programmable apparatus provide steps for implementing the functions/acts specified in the flowchart and/or block diagram block or blocks.

The flowcharts and block diagrams m the figures may illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, may be implemented by special purpose hardware-based systems that perform the specified functions or acts, or combinations of special purpose hardware and computer instructions.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

A number of implementations have been described. Having thus described the disclosure of the present application in detail and by reference to embodiments thereof, it will be apparent that modifications and variations are possible without departing from the scope of the disclosure defined in the appended claims.

The invention claimed is:

1. A vehicular control system, the vehicular control system comprising:

a plurality of electronic control units (ECUs) disposed at a vehicle equipped with the vehicular control system, wherein each respective ECU of the plurality of ECUs provides a respective quantity of computational units representative of an amount of processing power of the respective ECU, and wherein the plurality of ECUs are configured to operate the equipped vehicle in a nominal autonomous operational mode that provides a first level of autonomous vehicle control;

wherein the plurality of ECUs operate the equipped vehicle in the nominal autonomous operational mode when the vehicular control system determines that a sum of the quantity of computational units exceeds a first threshold representative of an amount of processing power required to operate in the nominal autonomous operational mode;

wherein the vehicular control system, while the plurality of ECUs operate the equipped vehicle in the nominal autonomous operational mode, and responsive to detecting a failure of one ECU of the plurality of ECUs, determines whether a sum of the quantity of computational units of the remaining ECUs of the plurality of ECUs that do not have a failure exceeds the first threshold;

wherein the plurality of ECUs, responsive to the vehicular control system determining that the sum of the quantity of computational units of the remaining ECUs of the plurality of ECUs that do not have a failure fails to exceed the first threshold, determines whether the sum of the quantity of computational units of the remaining ECUs that do not have a failure exceeds a second threshold representative of an amount of processing power required to operate in a degraded autonomous operational mode; and wherein the plurality of ECUs, responsive to the vehicular control system determining that the sum of the quantity of computational units of the remaining ECUs of the plurality of ECUs that do not have a failure exceed the second threshold, switches from operating the equipped vehicle in the nominal autonomous operational mode to operating the equipped vehicle in the degraded autonomous operational mode that provides a second level of autonomous vehicle control that is less capable than the first level of autonomous vehicle control, and wherein (i) a maximum speed the equipped vehicle is autonomously operated at while the plurality of ECUs operate the equipped vehicle in the degraded autonomous operational mode is less than a maximum speed the equipped vehicle is autonomously operated at while the plurality of ECUs operate the equipped vehicle in the nominal autonomous operational mode and (ii) operation of trajectory planning of the equipped vehicle comprises at least one selected from the group consisting of (a) obstacle detection, (b) autonomous passing maneuvers and (c) autonomous unprotected left turns is degraded while the plurality of ECUs operate the equipped vehicle in the degraded autonomous operational mode relative to when the equipped vehicle is autonomously operated at while the plurality of ECUs operate the equipped vehicle in the nominal autonomous operational mode.

2. The vehicular control system of claim 1, wherein the amount of processing power required to operate in the degraded autonomous operational mode is less than the amount of processing power required to operate in the nominal autonomous operational mode.

3. The vehicular control system of claim 1, wherein a first ECU of the plurality of ECUs has a first quantity of computational units, and wherein a second ECU of the plurality of ECUs has a second quantity of computational units that is different than the first quantity of computational units.

4. The vehicular control system of claim 1, wherein the second threshold is lower than the first threshold.

5. The vehicular control system of claim 1, wherein the plurality of ECUs, after the vehicular control system detects the failure of the one ECU of the plurality of ECUs, and responsive to the vehicular control system determining that the sum of the quantity of computational units of the remaining ECUs of the plurality of ECUs that do not have a failure continues to exceed the first threshold, continues to operate the equipped vehicle in the nominal autonomous operational mode.

6. The vehicular control system of claim 1, wherein the respective quantity of computational units provided by each respective ECU of the plurality of ECUs is the same.

7. The vehicular control system of claim 1, wherein, while the plurality of ECUs operate the equipped vehicle in the degraded autonomous operational mode, the plurality of ECUs halt processing of sensor data captured by a sensor disposed at the equipped vehicle.

8. The vehicular control system of claim 1, wherein a maximum object detection range of the equipped vehicle while the plurality of ECUs operate the equipped vehicle in the degraded autonomous operational mode is less than a maximum object detection range of the equipped vehicle while the plurality of ECUs operate the equipped vehicle in the nominal autonomous operational mode.

9. The vehicular control system of claim 1, wherein the equipped vehicle, responsive to the plurality of ECUs switching from operating the equipped vehicle in the nominal autonomous operational mode to operating the equipped vehicle in the degraded autonomous operational mode, comes to a stop.

10. A vehicular control system, the vehicular control system comprising:

a plurality of electronic control units (ECUs) disposed at a vehicle equipped with the vehicular control system, wherein each respective ECU of the plurality of ECUs provides a respective quantity of computational units representative of an amount of processing power of the respective ECU, wherein the respective quantity of computational units provided by a first respective ECU of the plurality of ECUs is different than the respective quantity of computational units provided by a second respective ECU of the plurality of ECUs, and wherein the plurality of ECUs are configured to operate the equipped vehicle in a nominal autonomous operational mode that provides a first level of autonomous vehicle control;

wherein the plurality of ECUs operate the equipped vehicle in the nominal autonomous operational mode when the vehicular control system determines that a sum of the quantity of computational units exceeds a first threshold representative of an amount of processing power required to operate in the nominal autonomous operational mode;

wherein the vehicular control system, while the plurality of ECUs operate the equipped vehicle in the nominal autonomous operational mode, and responsive to detecting a failure of one ECU of the plurality of ECUs, determines whether a sum of the quantity of computational units of the remaining ECUs of the plurality of ECUs that do not have a failure exceeds the first threshold;

wherein the plurality of ECUs, responsive to the vehicular control system determining that the sum of the quantity of computational units of the remaining ECUs of the plurality of ECUs that do not have a failure fails to exceed the first threshold, determines whether the sum of the quantity of computational units of the remaining ECUs of the plurality of ECUs that do not have a failure exceeds a second threshold representative of an amount of processing power required to operate in a degraded autonomous operational mode; and wherein the plurality of ECUs, responsive to the vehicular control system determining that the sum of the quantity of computational units of the remaining ECUs of the plurality of ECUs that do not have a failure exceed the second threshold, switches from operating the equipped vehicle in the nominal autonomous operational mode to operating the equipped vehicle in the degraded autonomous operational mode that provides a second level of autonomous vehicle control that is less capable than the first level of autonomous vehicle control, and wherein (i) a maximum speed the equipped vehicle is autonomously operated at while the plurality of ECUs operate the equipped vehicle in the degraded autonomous operational mode is less than a maximum speed the equipped vehicle is autonomously operated at while the plurality of ECUs operate the equipped vehicle in the nominal autonomous operational mode and (ii) operation of trajectory planning of the equipped vehicle comprises at least one selected from the group consisting of (a) obstacle detection, (b) autonomous passing maneuvers and (c) autonomous unprotected left turns is degraded while the plurality of ECUs operate the equipped vehicle in the degraded autonomous operational mode relative to when the equipped vehicle is autonomously operated at while the plurality of ECUs operate the equipped vehicle in the nominal autonomous operational mode.

11. The vehicular control system of claim 10, wherein the amount of processing power required to operate in the degraded autonomous operational mode is less than the amount of processing power required to operate in the nominal autonomous operational mode.

12. The vehicular control system of claim 10, wherein a maximum object detection range of the equipped vehicle while the plurality of ECUs operate the equipped vehicle in the degraded autonomous operational mode is less than a maximum object detection range of the equipped vehicle while the plurality of ECUs operate the equipped vehicle in the nominal autonomous operational mode.

13. The vehicular control system of claim 10, wherein the equipped vehicle, responsive to the plurality of ECUs switching from operating the equipped vehicle in the nominal autonomous operational mode to operating the equipped vehicle in the degraded autonomous operational mode, comes to a stop.

* * * * *